(12) United States Patent
Aono

(10) Patent No.: US 8,823,662 B2
(45) Date of Patent: Sep. 2, 2014

(54) INPUT APPARATUS

(75) Inventor: Tomotake Aono, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 113 days.

(21) Appl. No.: 13/392,873

(22) PCT Filed: Aug. 26, 2010

(86) PCT No.: PCT/JP2010/005273
§ 371 (c)(1),
(2), (4) Date: Feb. 27, 2012

(87) PCT Pub. No.: WO2011/024460
PCT Pub. Date: Mar. 3, 2011

(65) Prior Publication Data
US 2012/0154318 A1    Jun. 21, 2012

(30) Foreign Application Priority Data

Aug. 27, 2009   (JP) ................................. 2009-197394

(51) Int. Cl.
*G06F 3/041* (2006.01)
(52) U.S. Cl.
USPC ........................................................ 345/173
(58) Field of Classification Search
None
See application file for complete search history.

(56) References Cited

U.S. PATENT DOCUMENTS

| 5,712,662 | A * | 1/1998 | Miyazaki et al. ............. 345/173 |
| 6,723,931 | B2 * | 4/2004 | Marek et al. ................. 200/16 D |
| 7,728,819 | B2 | 6/2010 | Inokawa |
| 2002/0144886 | A1 * | 10/2002 | Engelmann et al. .......... 200/600 |
| 2005/0088417 | A1 | 4/2005 | Mulligan |
| 2006/0052143 | A9 | 3/2006 | Tuovinen |
| 2007/0146334 | A1 | 6/2007 | Inokawa |
| 2008/0174901 | A1 * | 7/2008 | Tanimura et al. ............ 360/72.1 |
| 2009/0267902 | A1 | 10/2009 | Nambu et al. |

FOREIGN PATENT DOCUMENTS

| CN | 1845043 A | 10/2006 |
| CN | 1898631 A | 1/2007 |
| JP | 62-296317 | 12/1987 |
| JP | 63-130357 A | 6/1988 |
| JP | H4-369543 A | 12/1992 |
| JP | 11-212725 A | 8/1999 |
| JP | 2002373540 A * | 12/2002 |

(Continued)

OTHER PUBLICATIONS

International Search Report; PCT/JP2011/006326; Feb. 14, 2012.*

(Continued)

*Primary Examiner* — Nicholas Lee
(74) *Attorney, Agent, or Firm* — Studebaker & Brackett PC

(57) ABSTRACT

An input apparatus has a touch sensor 11 configured to detect a touch input, a piezoelectric element 13 mounted on the touch sensor 11, a load detection unit 18 configured to detect a pressure load on a touch face 11a of the touch sensor 11 based on an output of the piezoelectric element 13 and to determine whether the pressure load satisfies a standard to provide a tactile sensation, and a piezoelectric element drive unit 15 configured to drive the piezoelectric element 13, when the load detection unit 18 determines that the pressure load satisfies the standard, such that the tactile sensation is provided to an object pressing the touch face 11. The load detection unit 18 resumes detection of the pressure load after a predetermined period from drive of the piezoelectric element 13 by the piezoelectric element drive unit 15.

3 Claims, 10 Drawing Sheets

(56) References Cited

FOREIGN PATENT DOCUMENTS

| JP | 2003-288158 A | | 10/2003 |
|---|---|---|---|
| JP | 2006-048302 A | | 2/2006 |
| JP | 2006-107140 A | | 4/2006 |
| JP | 2007-086990 A | | 4/2007 |
| JP | 2008-130055 A | | 6/2008 |
| JP | 2008199880 A | * | 8/2008 |
| KR | 10-2006-0113917 A | | 11/2006 |

OTHER PUBLICATIONS

An Office Action issued by the Korean Patent Intellectual Property Office on May 28, 2013, which corresponds to Korean Patent Application No. 10-2012-7005016 and is related to U.S. Appl. No. 13/392,873; with translation.

The extended European Search Report dated Feb. 18, 2013, which corresponds to EP Application No. 10811516.3 and is related to U.S. Appl. No. 13/392,873.

The Japanese Office Action "Notification of Reason for Refusal" dated Feb. 5, 2013, which corresponds to Japanese Patent Application No. 2010-247733, and is related to U.S. Appl. No. 13/392,873 with translation.

Y. Morikawa; Notification of Reason for Refusal; Japanese Office Action; Japanese Patent Application No. 2009-197394 with translation; drafting date Mar. 5, 2010.

A .Toyoda; Official Decision of Refusal; Japanese Office Action; Japanese Patent Application No. 2009-197394 with translation; drafting date Jul. 26, 2010.

Y. Morikawa; Appeal Decision of Refusal; Japanese Office Action; Japanese Patent Application No. 2009-197394 with translation; Nov. 29, 2011.

S. Mizuno; Interrogation; Japanese Office Action; Japanese Patent Application No. 2009-197394 with translation; Aug. 23, 2011.

International Search Report; PCT/JP2010/005273; Oct. 12, 2010.

S.Mizuno; Office Action; Japanese Patent Application No. 2010-024832; Aug. 23, 2011.

"Notification of the First Office Action," issued by the State Intellectual Property Office of China on Jan. 16, 2014, which corresponds to Chinese Patent Application No. 201080038148.4 and is related to U.S. Appl. No. 13/392,873; with English language translation.

An Office Action; "Decision of Rejection," issued by the Japanese Patent Office on Nov. 26, 2013, which corresponds to Japanese Patent Application No. 2010-247733 and is related to U.S. Appl. No. 13/392,873; with English language concise explanation.

An Office Action issued by the Korean Patent Office on Nov. 8, 2013, which corresponds to Korean Patent Application No. 10-2012-7005016 and is related to U.S. Appl. No. 13/392,873; with English statement of relevance.

An Office Action issued by the Korean Patent Office on Jan. 6, 2014 which corresponds to Korean Patent Application No. 10-2012-7005016 and is related to U.S. Appl. No. 13/392,873; with English language statement of relevance.

An Office Action issued by the European Patent Office on Jun. 18, 2014, which corresponds to EP 10811516.3-1954 and is related to U.S. Appl. No. 13/392,873.

* cited by examiner

FIG. 4
(a)
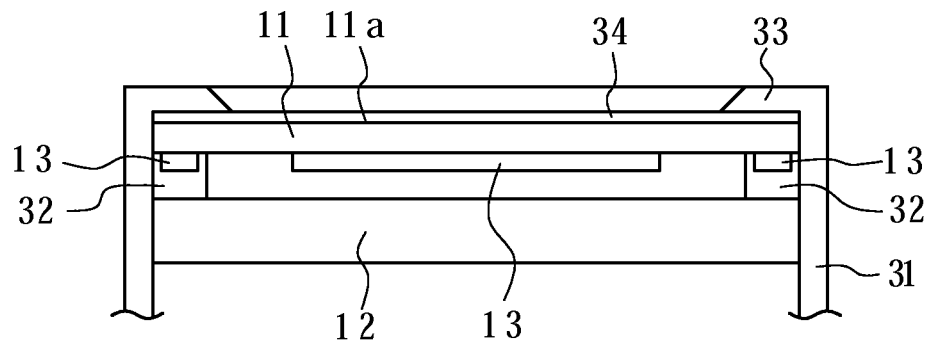
(b)
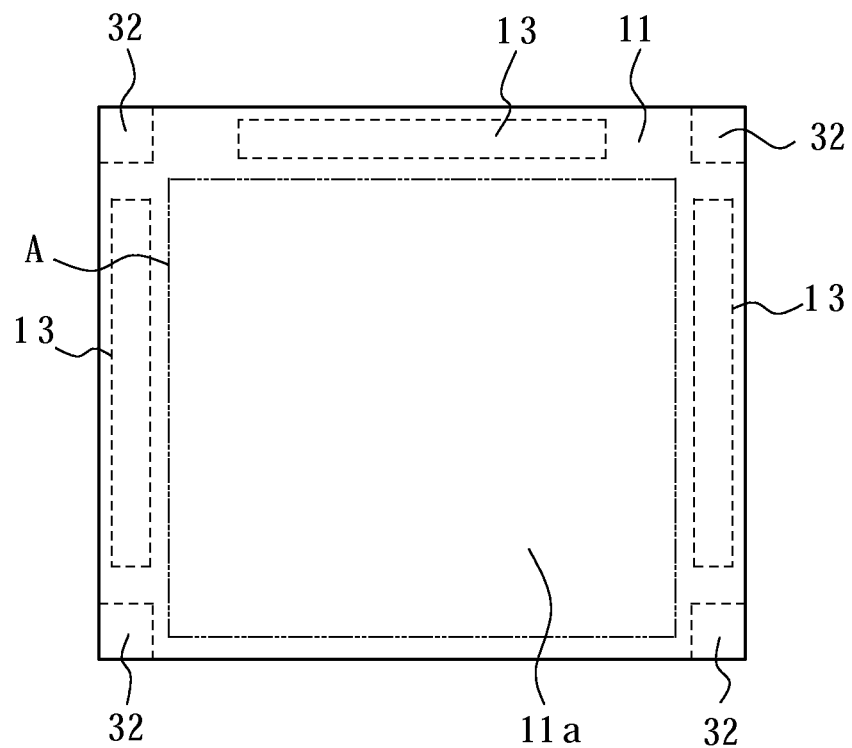

INPUT APPARATUS

CROSS REFERENCE TO RELATED APPLICATION

This application claims priority to and the benefit of Japanese Patent Application No. 2009-197394 filed on Aug. 27, 2009, the entire contents of which are incorporated herein by reference.

TECHNICAL FIELD

The present invention relates to an input apparatus having a touch sensor.

BACKGROUND ART

In recent years, input apparatus such as operation units, switches and the like having touch sensors such as touch panels, touch switches and the like to receive input operations by users have been widely used for mobile terminals such as mobile phones, information equipment such as calculators and ticket vending machines, home electric appliances such as microwaves, TV sets and lighting equipment, industrial equipment (FA equipment) and the like.

There are known a variety of types of those touch sensors, such as a resistive film type, a capacitive type, an optical type and the like. However, touch sensors of these types receive a touch input by a finger or a stylus pen and, unlike push-button switches, the touch sensors themselves are not physically displaced even when being touched.

Since the touch sensors themselves are not physically displaced when touched, an operator cannot obtain feedback to an input even though the touch input is received. As a result, the operator is likely to input erroneously by touching the same spot multiple times, which may be stressful for the operator.

As methods to prevent such erroneously repetitious inputs, there are known methods of visually or auditory confirming the input operations by, for example, generating sounds or by changing a display state, such as colors of input objects such as input buttons and the like graphically depicted in a display unit, according to an input position upon reception of the touch input.

However, such auditory feedback may be difficult to be confirmed in a noisy environment and is not applicable when the equipment being used is in a silent mode. In addition, in using such visual feedback, when the operator is inputting by the finger, if the input object displayed on the display unit is small, the operator may not be able to confirm the change in the display state, as a view of the input object is blocked by a finger.

There is also suggested a feedback method relying on neither the auditory- nor visual sensation but instead generating a tactile sensation at operator's fingertip by vibrating the touch sensor when the touch sensor receives an input (for example, see Patent Documents 1, 2).

RELATED ART DOCUMENTS

Patent Documents

Patent Document 1: Japanese Patent Laid-Open No. 2003-288158
Patent Document 2: Japanese Patent Laid-Open No. 2008-130055

SUMMARY OF INVENTION

Technical Problem

The techniques disclosed in the above Patent Documents 1 and 2, however, merely vibrate the touch sensor when the touch sensor receives an input. Therefore, in using the input apparatus having the button switch such as a mechanical push-button switch (push-type button switch) graphically depicted on the touch sensor having a low threshold to receive the input, a tactile sensation is provided when the finger or the like lightly contacts (touches) the touch sensor. It may trigger erroneous operations by responding to an unintentional motion (touch) before the operator pushes and inflict a feeling of strangeness on the operator upon the unintentional motion (touch). Here, the threshold for the touch sensor to receive a touch input is a threshold at which the touch sensor responds, which is, for a touch sensor of the resistive film type, a threshold of a pressure at which an upper conductive film is contacted to a lower conductive film and, for a touch sensor of the capacitive type, a threshold for detection of an electric signal by contact.

In order to clear such a disadvantage, the applicant has developed an input apparatus which detects a pressure load on a touch face of the touch sensor and, when the pressure load detected reaches a predetermined standard to provide the tactile sensation, vibrates the touch face. This input apparatus, when the load detected satisfies the predetermined standard to provide the tactile sensation, provides a pressing object such as a finger with a click sensation obtained when depressing a push-button switch such as a metal dome in pressing such the metal dome switch.

According to this input apparatus, the tactile sensation is provided when the operator pushes the touch face and the pressure load of the push reaches the predetermined standard. As a result, it is possible to allow the operator to perceive reception of an input while reliably preventing erroneous operations triggered by an unintentional touch described above and the feeling of strangeness.

To configure such the input apparatus, a load sensor to detect the pressure load on the touch sensor and an actuator to vibrate the touch sensor are used in addition to basic components such as the touch sensor and a control unit. As a result, the number of components and cost are increased, as well as a size of the apparatus to retain necessary space for the components.

In order to reduce cost and the size of the apparatus, the applicant has developed an apparatus which utilizes direct piezoelectric effect and converse piezoelectric effect of a piezoelectric element serving as the load sensor to detect the pressure load on the touch face of the touch sensor and the actuator to vibrate the touch face such that the tactile sensation is provided to the pressing object.

As a result of various experiments and studies, however, the applicant found out that, in using the piezoelectric element for as the load sensor and as the actuator, there is a need for an improvement as follows. In this case, for example, it is assumed that the piezoelectric element is connected to a piezoelectric control circuit, which detects the pressure load based on an output voltage of the piezoelectric element and then supplies a drive signal to the piezoelectric element to vibrate the piezoelectric element when the pressure load satisfies the predetermined standard to provide the tactile sensation.

As illustrated in FIG. 8, for example, at a point P when an output voltage Vs of the piezoelectric element reaches a standard voltage Vref corresponding to the standard of the pressure load to provide the tactile sensation after increasing in accordance with the pressure on the touch sensor by the pressing object, a required drive signal Vd is applied to the piezoelectric element in order to drive the piezoelectric element. Thereby, it is possible to provide the operator with the click sensation obtained upon depression of the push-button switch such as the metal dome when such the metal dome switch is pressed. In FIG. 8, as the drive signal Vd, a sine wave with a predetermined frequency for one period is applied.

In this case, however, the piezoelectric element is vibrated under the load, that is, while the touch sensor is pressed by the pressing object. Accordingly, the drive signal Vd to vibrate the piezoelectric element is larger than the output voltage Vs generated when pressed by the pressing object and, for example, $30 V_{p-p}$. Moreover, in a state that the output voltage Vs of the piezoelectric element is at the standard voltage Vref, the drive signal Vd is applied superimposing the output voltage Vs (standard voltage Vref). Therefore, it may exceed a range of a working voltage of some piezoelectric elements, resulting in limiting usable piezoelectric elements.

As a countermeasure, it may be considered to separately install the load detection unit to detect the pressure load based on the output voltage Vs of the piezoelectric element and a piezoelectric element drive unit to drive the piezoelectric element with the drive signal Vd, such that one of these units is selectively connected to the piezoelectric element and controls drive of the piezoelectric element. Thereby, as illustrated in FIG. 9, for example, connection of the piezoelectric element is switched to the piezoelectric element drive unit at the point P when the load detection unit detects that the output voltage Vs of the piezoelectric element reaches the standard voltage Vref to provide the tactile sensation. Then, the piezoelectric element drive unit vibrates the piezoelectric element with the drive signal Vd such that the click sensation is provided.

According to further experiments and studies, however, the inventor observed that, when the load detection unit and the piezoelectric element drive unit are separately installed to control drive of the piezoelectric element, the output voltage Vs of the piezoelectric element detected by the load detection unit after drive of the piezoelectric element does not change as illustrated in FIG. 9. That is, it was observed that the output voltage Vs is affected by the drive signal Vd applied from the piezoelectric element drive unit immediately before start of load detection or by the pressure load of the pressing object in pressing.

As illustrated in FIG. 9, for example, when it is detected that the output voltage Vs of the piezoelectric element reaches the standard voltage Vref, the drive signal Vd is applied to the piezoelectric element to drive it. Subsequently, connection of the piezoelectric element is switched to the load detection unit and the output voltage Vs of the piezoelectric element monitored changes as illustrated in FIG. 10, for example. That is, when the output voltage Vs of the piezoelectric element increases to a positive polarity side when the touch sensor starts being pressed, the output voltage Vs immediately after the piezoelectric element is driven increases to a negative polarity side relatively sharply. After that, the output voltage Vs represents a movement to gradually return to 0 V in accordance with self-discharge of accumulated charge.

Presumably, such a phenomenon is seen not only when applying the drive signal to provide the click sensation similar to that obtained when operating the push-button switch but also when applying the drive signal to provide the tactile sensation perceived as a "throbbing" sensation.

Therefore, if detection of the pressure load starts immediately after drive of the piezoelectric element and, for example, the operator carries out a pressing operation with a voltage exceeding the standard voltage Vref before the residual electric charge of the piezoelectric element is reduced down to substantially 0V, the tactile sensation is unexpectedly provided and the operator may have the feeling of strangeness. In addition, it may be considered, in a case illustrated in FIG. 10, for example, to set a negative standard voltage Vref against a positive standard voltage Vref for the load detection unit and to start detection of the pressure load immediately after drive of the piezoelectric element. In this case, however, the piezoelectric element is driven at a point Q when the output voltage Vs reaches the negative standard voltage Vref. As a result, the click sensation is continuously provided to the operator in a short period, which is different from the tactile sensation of the push-button switch, thereby inflicting the feeling of strangeness on the operator.

With some drive signal applied to the piezoelectric element, the output voltage Vs after drive of the piezoelectric element may change from 0V to the positive polarity side, opposite to the output voltage Vs illustrated in FIG. 10. In this case, when detection of the pressure load starts immediately after drive of the piezoelectric element, the output voltage Vs reaches the standard voltage Vref immediately after drive of the piezoelectric element, thereby the piezoelectric element is driven. As a result, the click sensation is provided to the operator continuously in a short period, which is also different from the tactile sensation of the push-button switch, thereby inflicting the feeling of strangeness on the operator.

As described above, in using the piezoelectric element serving as the load sensor and the actuator to provide the tactile sensation and switching connection of the piezoelectric element between the load detection unit for an operation to detect the pressure load and the piezoelectric element drive unit for an operation to drive the piezoelectric element, the output voltage Vs after drive of the piezoelectric element does not correspond to an actual pressure load of pressing. Accordingly, when the load detection unit resumes detection of the pressure load and controls drive of the piezoelectric element immediately after drive of the piezoelectric element, there may be a case that the tactile sensation is not appropriately provided to the operator.

Hence, an object of the present invention, in consideration of such conditions, is to provide an input apparatus capable of reducing cost and its size and allowing use of various types of piezoelectric elements, as well as appropriately providing the tactile sensation to the operator without inflicting the feeling of strangeness on the operator in operating the touch sensor.

Solution to Problem

In order to achieve the above object, an input apparatus according to a first aspect of the present invention includes:
a touch sensor configured to detect a touch input;
a piezoelectric element mounted on the touch sensor;
a load detection unit configured to detect a pressure load on a touch face of the touch sensor based on an output of the piezoelectric element and to determine whether the pressure load satisfies a standard to provide a tactile sensation; and
a piezoelectric element drive unit configured to drive the piezoelectric element, when the load detection unit determines that the pressure load satisfies the standard, such that the tactile sensation is provided to an object pressing the touch face, wherein the load detection unit resumes detection of the pressure load after a predetermined period from drive of the piezoelectric element by the piezoelectric element drive unit.

A second aspect of the present invention is the input apparatus according to the first aspect, further including a discharge circuit configured to discharge residual electric charge accumulated in the piezoelectric element, wherein
the discharge circuit discharges, in the predetermined period, the residual charge accumulated in the piezoelectric element.

A third aspect of the present invention is the input apparatus according to the first aspect, wherein
the predetermined period is 40 ms or less.

Effect of the Invention

The input apparatus according to the present invention, utilizing direct piezoelectric effect and converse piezoelectric effect of the piezoelectric element, uses the piezoelectric element as a load sensor to detect the pressure load on the touch face of the touch sensor and as an actuator to vibrate the touch face. It is thus possible to reduce the number of components and the cost as well as to save space for the components for downsizing the apparatus. In addition, having the load detection unit to detect the pressure load based on the output of the piezoelectric element and the piezoelectric element drive unit to drive the piezoelectric element, the input apparatus drives the piezoelectric element with a drive signal alone without superimposing the drive signal on the output of the piezoelectric element. Thereby, it is possible to lower a range of a working voltage, which enables use of various types of piezoelectric elements. Moreover, since the load detection unit resumes detection of the pressure load after the predetermined period from drive of the piezoelectric element, it is possible to appropriately provide the tactile sensation to an operator without inflicting a feeling of strangeness on the operator.

BRIEF DESCRIPTION OF DRAWINGS

FIG. 4 illustrates a cross-sectional view of a main section and a plane view of the main section which are illustrating an exemplary housing structure of the input apparatus according to the present invention;

DESCRIPTION OF EMBODIMENTS

Embodiments of the present invention will be described with reference to the accompanying drawings.

First Embodiment

Figure 1:
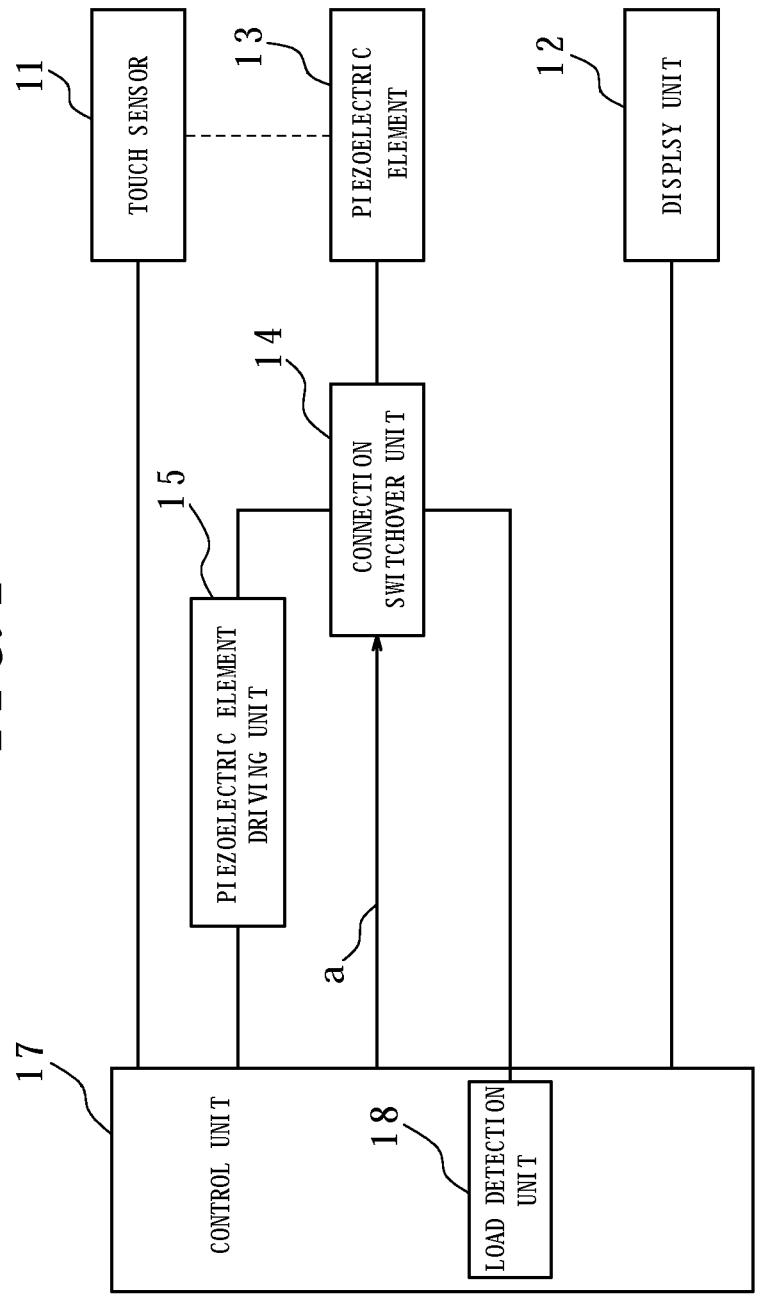
FIG. 1 is a functional block diagram illustrating a schematic configuration of an input apparatus according to a first embodiment of the present invention.

FIG. 1 is a functional block diagram illustrating a schematic configuration of an input apparatus according to a first embodiment of the present invention. This input apparatus has a touch sensor 11, a display unit 12, a piezoelectric element 13, a connection switchover unit 14, a piezoelectric element drive unit 15, and a control unit 17 to control an operation of each unit.

The touch sensor 11 is connected to the control unit 17 and, under control of the control unit 17, detects a touch input to a touch face of the touch sensor 11 by a pressing object, such as a finger and the like, and provides the control unit 17 with position information of a touch position. The touch sensor 11 may be of a known type, such as a resistive film type, a capacitive type, an optical type and the like, and disposed on the display unit 12.

The display unit 12 is connected to the control unit 17 and, under control of the control unit 17, displays an input object of an input button and the like such as a push-button switch (push-type button switch). The display unit 12 may be constituted by, for example, a liquid crystal display panel, an organic EL display panel and the like. The touch input to the input object displayed on the display unit 12 is detected by the control unit 17 based on the position information output from the touch sensor 11.

The piezoelectric element 13 is mounted on the touch sensor 11 and designed to be bent (strained) under pressure of the touch face of the touch sensor 11. The piezoelectric element 13 is connected to the connection switchover unit 14 and selectively connected to the control unit 17 or the piezoelectric element drive unit 15 via the connection switchover unit 14.

The connection switchover unit 14 selectively connects the piezoelectric element 13 to the control unit 17 or the piezoelectric element drive unit 15 based on a connection switchover signal from the control unit 17. The piezoelectric element drive unit 15 may include a power amplifier and the like and outputs a predetermined drive signal to vibrate the piezoelectric element 13 under control of the control unit 17.

When connected to the control unit 17 via the connection switchover unit 14, the piezoelectric element 13 supplies the control unit 17 with a voltage (output signal) of electric charge generated by pressure on the touch face of the touch sensor 11. In addition, when connected to the piezoelectric element drive unit 15 via the connection switchover unit 14, the piezoelectric element 13 is driven by the predetermined drive signal supplied from the piezoelectric element drive unit 15. Thereby, the touch sensor 11 is vibrated and provides a tactile sensation to the pressing object pressing the touch face.

The control unit 17 may be, for example, a CPU and the like and includes a load detection unit 18 configured to detect the pressure load based on the output signal from the piezoelectric element 13 and determines whether the pressure load satisfies a standard to provide the tactile sensation. In addition, the control unit 17 controls the operation of each unit based on position information from the touch sensor 11, display information for the display unit 12, a result of determination by the load detection unit 18 and the like.

Figure 2:
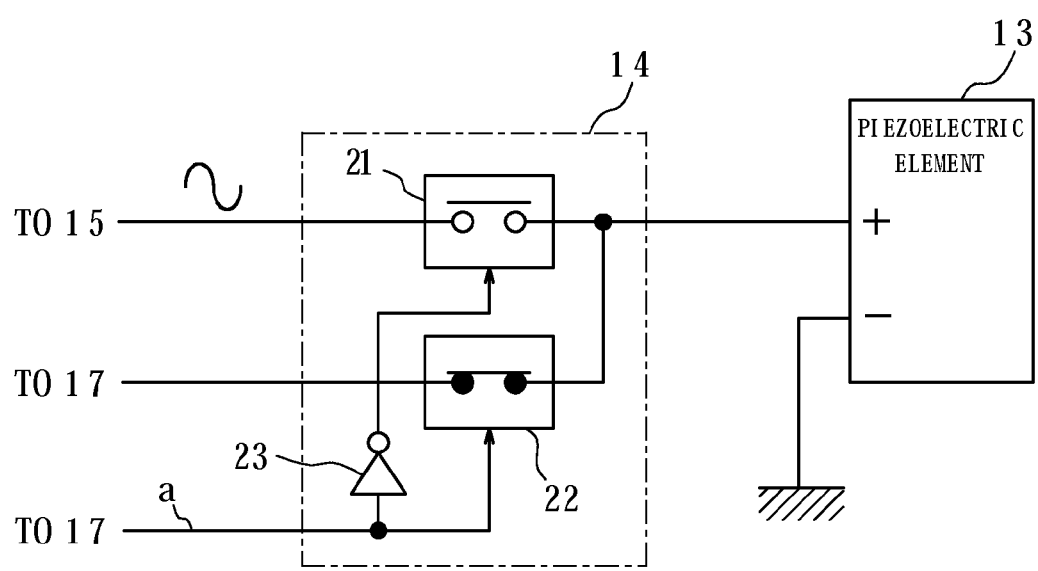
FIG. 2 is a circuit diagram illustrating an example of a configuration of a connection switchover unit illustrated in FIG. 1.

FIG. 2 is a circuit diagram illustrating an example of a configuration of the connection switchover unit 14 illustrated in FIG. 1. The connection switchover unit 14 includes two switch circuits 21, 22, which are semiconductor relays and the like, and an inverter 23. Each of the switch circuits 21, 22 has an ON/OFF contact point. The ON/OFF contact point of the switch circuit 21 is connected between a positive electrode terminal of the piezoelectric element 13 and an output terminal (not illustrated) of the piezoelectric element drive unit 15. The ON/Off contact point of the switch circuit 22 is connected between the positive electrode terminal of the piezoelectric element 13 and an analogue/digital conversion input terminal (not illustrated) of the control unit 17.

The ON/OFF contact point of the switch circuit 21 is turned ON/OFF by a connection switchover signal a output from the control unit 17 through the inverter 23. The ON/OFF contact point of the switch circuit 22 is turned ON/OFF by the connection switchover signal a set forth above. Accordingly, when one of the ON/OFF contact points of the switch circuits 21, 22 is ON, the other is OFF.

Figure 3:
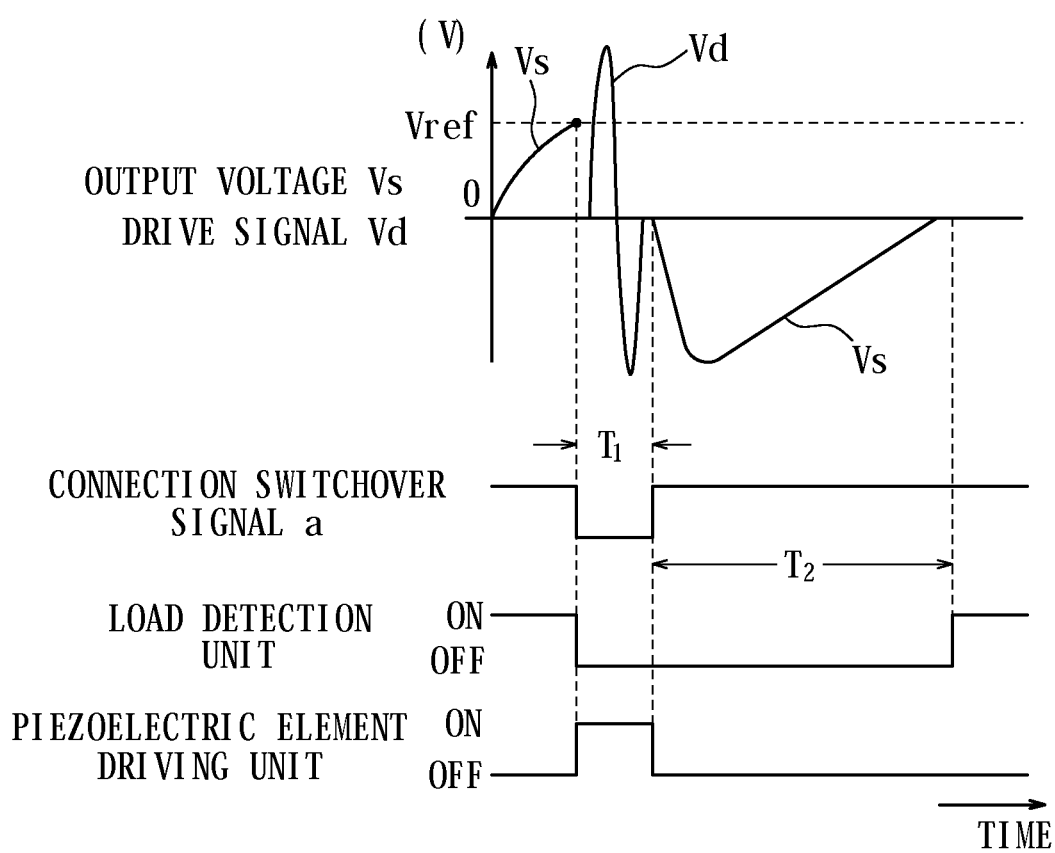
FIG. 3 is a timing chart illustrating a schematic operation of the input apparatus illustrated in FIG. 1.

FIG. 3 is a timing chart illustrating a schematic operation of the input apparatus according to the present embodiment. FIG. 3 illustrates an output signal (voltage) Vs and a drive signal Vd of the piezoelectric element 13, the connection switchover signal a, and motion states of the load detection unit 18 and the piezoelectric element drive unit 15 to the piezoelectric element 13. The control unit 17 sets the connection switchover signal ordinarily a at a high (H) level. Thereby, the switch circuit 21 of the switchover control unit 14 is turned OFF and the switch circuit 22 ON such that the piezoelectric element 13 is connected to the control unit 17.

In this state, the control unit 17 monitors an output of the touch sensor 11. In addition, the load detection unit 18 of the control unit 17 detects the pressure load on the touch sensor 11 based on the output voltage Vs of the piezoelectric element 13 and determines whether the pressure load detected satisfies the standard to provide the tactile sensation. When the position information from the touch sensor 11 indicates that an input is carried out to the input object displayed on the display unit 12 and the load detection unit 18 determines that the output voltage Vs of the piezoelectric element 13 has reached a standard voltage Vref corresponding to the standard load (for example, 1.5 N) to provide the tactile sensation, the control unit 17 sets the contact switchover signal a at a low (L) level for only a predetermined period $T_1$. Thereby, the switch circuit 21 of the switchover control unit 14 is turned ON and the switch circuit 22 OFF such that the piezoelectric element 13 is connected to the piezoelectric element drive unit 15.

Then, while the piezoelectric element 13 is connected to the piezoelectric element drive unit 15, the control unit 17 controls the piezoelectric element drive unit 15 to output a predetermined drive signal Vd to drive the piezoelectric element 13. Thereby, the touch panel 11 is vibrated such that the tactile sensation is provided to the pressing object pressing the touch face. In addition, the control unit 17 performs predetermined operations for the input object on the display unit 12 such as, for example, changing a display state, displaying a character corresponding to the input object in a predetermined display area, executing and processing application corresponding to the object, and the like.

Then, when the piezoelectric element drive unit 15 finishes driving the piezoelectric element 13, the control unit 17 sets the connection switchover signal a at the level H and turns the switch circuit 21 back to OFF and the switch circuit 22 back to ON. Thereby, the piezoelectric element 13 is disconnected from the piezoelectric element drive unit 15 and connected to the control unit 17.

Before the predetermined period expires after the piezoelectric element 13 is driven, for example, until a predetermined period $T_2$ expires after a point when, for example, the connection switchover signal a is switched from the level L to the level H, the load detection unit 18 neutralizes (cancels) the output voltage Vs from the piezoelectric element 13. Then, from the point when the predetermined period $T_2$ expires, the load detection unit 18 enables the output voltage Vs of the piezoelectric element 13 and resumes detection of the pressure load based on the output voltage Vs.

Here, the predetermined period $T_1$ to maintain the connection switchover signal a at the level L may be fixedly set (for example, approximately 10 ms) including a drive time of the piezoelectric element 13 or automatically set based on the drive time by the drive signal corresponding to the tactile sensation to provide. In addition, the predetermined period $T_2$, which is a period between drive of the piezoelectric element 13 and resumption of detection of the pressure load by the load detection unit 18, is set to be a sufficient time such that the residual electric charge in the piezoelectric element 13 is substantially completely discharged and also such that detection of the load of each input operation in continuous input operations and the like is not prevented. The predetermined period $T_2$ is, for example, 40 ms or less.

According to the present embodiment, as described above, the input apparatus, utilizing direct piezoelectric effect and converse piezoelectric effect of the piezoelectric element 13, uses the piezoelectric element 13 to serve as a load sensor to detect the pressure load on the touch face of the touch sensor 11 and as an actuator to vibrate the touch face such that the tactile sensation is provided to the pressing object. Thereby, the same component is shared for a plurality of functions. It is thus possible to reduce the number of components and the cost as well as to save space for the components for downsizing the apparatus.

Since the load detection unit 18 and the piezoelectric element drive unit 15 are provided to selectively connect to the piezoelectric element 13, the drive signal Vd may be supplied from the piezoelectric element drive unit 15 to the piezoelectric element 13 separately from the output voltage Vs of the piezoelectric element 13. Accordingly, it is not necessary to apply a voltage adding up the output voltage Vs and the drive signal voltage Vd. Thus the range of the working voltage is lowered and use of various types of the piezoelectric elements is enabled. Moreover, after driving the piezoelectric element 13, that is, after providing the tactile sensation first in accordance with increase in the pressure load of the touch input, the load detection unit 18 resumes detection of the pressure load when the predetermined period $T_2$ expires. Accordingly, the tactile sensation is not provided even if the output voltage Vs exceeds the standard voltage Vref in accordance with increase in the pressure by the pressing object during the predetermined period $T_2$. It is thus possible to appropriately provide the tactile sensation to the operator without inflicting a feeling of strangeness on the operator due to providing an unexpected tactile sensation.

Next, (1) a housing structure, (2) the standard of the pressure load to provide the tactile sensation, and (3) the drive signal to drive the piezoelectric element 13 according to the input apparatus of the present embodiment will be described.

(1) Housing Structure

FIG. 4 illustrates an exemplary housing structure of the touch sensor 11, the display unit 12 and the piezoelectric element 13 illustrated in FIG. 1; FIG. 4(a) is a cross-sectional view of a main section, and FIG. 4(b) is a plane view of the main section. The display unit 12 is contained in a housing 31.

The touch sensor 11 is disposed on the display unit 12 via insulators 32 made of elastic members. According to the present embodiment, the touch sensor 11 is disposed on the display unit 12 via the insulators 32 arranged at four corners outside a display area A of the display unit 12 illustrated by a chain double-dashed line in FIG. 4(b).

The housing 31 is provided with an upper cover 33 covering a surface area of the touch sensor 11 outside the display area of the display unit 12. For a dust-proof purpose, an insulator 34 made of elastic member is arranged between the upper cover 33 and the touch sensor 11.

The touch sensor 11 illustrated in FIG. 4 may have, for example, a surface member having a touch face 11a and constituted by a transparent film or the glass, and a rear face member constituted by the glass or acryl. The touch sensor 11 is designed such that, when the touch face 11a is pressed down via the insulator 34, a pushed part and an entire touch sensor 11 are bent (strained) slightly in accordance with the pressure.

The piezoelectric element 13 is provided on the rear face of the touch sensor 11 at a position covered by the upper cover 33 close to a periphery on one side or each of a plurality of sides, for example, three sides. These three piezoelectric elements 13 detect the pressure load on the touch face 11a of the touch sensor 11 and vibrate the touch sensor 11 such that the tactile sensation is provided to the pressing object pressing the touch face 11a. It is to be noted that the housing 31, the upper cover 33 and the insulator 34 illustrated in FIG. 4(a) are omitted in FIG. 4(b).

Here, the three piezoelectric elements 13 are connected to the piezoelectric element drive unit 15 via the connection switchover unit 14 and driven by a common drive signal or individual drive signals. The three piezoelectric elements 13 supply the outputs in parallel to the load detection unit 18 via the connection switchover unit 14.

Then, the load detection unit 18 calculates the pressure load based on the output signals from the three piezoelectric elements 13. Preferably, results of calculation of the pressure loads are approximately the same when the operator feels nearly the same pressure sensation (hard feeling, soft feeling and the like) at each position on the touch face 11a. To that end, the load detection unit 18 calculates the pressure load based on, for example, an average value of the outputs of the three piezoelectric elements 13, a weighted additional value and the like. Additionally, it is preferable to apply individual drive signals to the three piezoelectric elements 12 such that the operator obtains nearly the same pressure sensation and nearly the same tactile sensation (feeling of texture and the like) at each position on the touch face 11a. Therefore, the piezoelectric element drive unit 15 appropriately changes amplitude, a phase and the like of each of the drive signals in accordance with a position and a location on the touch face 11a such that an approximately identical feeling of a combination of the pressure sensation and the tactile sensation is obtained.

(2) Standard of Pressure Load

The standard of the pressure load to provide the tactile sensation may be appropriately set in accordance with a load characteristic of an intended push-button switch in pressing. For example, the standard is set to be equal to a load at which the touch sensor 11 responds to the touch input (synchronizing a timing to provide the tactile sensation with a timing of response to the touch input by the touch sensor 11) or to be higher than the load at which the touch sensor 11 responds to the touch input (setting the timing to provide the tactile sensation later than the timing of response to the touch input by the touch sensor 11). For example, when the input apparatus according to the present embodiment is applied to a mobile terminal, it is preferable to set the standard equal to or higher than the load at which the touch sensor 11 responds to the touch input (setting the timing to provide the tactile sensation later than the timing of response to the touch input by the touch sensor 11). Preferably, the standard is set by users as desired, such that an elder user may set it heavier (slower), whereas a user who often writes messages may set it lighter (quicker).

(3) Drive Signal

The drive signal to drive the piezoelectric element 13 by the piezoelectric element drive unit 15 may be appropriately determined based on the tactile sensation to provide. For example, in order to provide a click sensation "Cli", which is obtained when pressing the push-button switch employed by the mobile terminal, the piezoelectric element drive unit 15 drives the piezoelectric element 13 as follows. Upon application of the pressure load satisfying the standard set forth above, the drive signal, for example, a sine wave with a constant frequency of, for example, 100 Hz to 200 Hz, preferably 170 Hz, for 1 period is applied to the piezoelectric element 13 such that the touch face 11a is vibrated by approximately 15 nm while the pressure load satisfying the standard is applied thereto. Thereby, it is possible to allow the operator to recognize that an input operation is completed, by providing a realistic click sensation to the operator through the pressing object (pressing means) pressing the touch face 11a of the touch sensor 11. Similarly, in order to provide another click sensation "Click", which is a sensation harder than the click sensation "Cli", the piezoelectric element drive unit 15 applies the drive signal, for example, a sine wave or a square wave with a frequency of, for example, approximately 200 Hz to 500 Hz, for 1 period to the piezoelectric element 13.

In order to provide a tactile sensation different from the click sensation such as, for example, a soft tactile sensation such as a "throbbing" sensation and a "jelly-like" sensation, the drive signal, for example, a sine wave with a frequency of approximately 200 Hz to 500 Hz, for two or three periods is applied. Alternatively, in order to provide a "vibrating" sensation, the drive signal, for example, a sine wave with a frequency of approximately 200 Hz to 500 Hz, for four or more periods is applied.

Preferably, information on the drive signals to provide those various tactile sensations is stored in a memory unit (not illustrated) such that the user suitably sets the drive signal to provide a desired tactile sensation. It is also preferable, based on the drive signal set, to automatically set the period $T_1$, in which the connection switchover signal a is set at the level L.

As described above, the control unit 17 does not drive the piezoelectric element 13 until the load applied to the touch sensor 11 calculated based on the output of the piezoelectric element 13 satisfies the standard to provide the tactile sensation (for example, 1.5 N). Thereby, a tactile sensation of the operator is stimulated. Then, when the load satisfies the standard, the control unit 17 controls the piezoelectric element drive unit 15 to drive the piezoelectric element 13 with the predetermined drive signal such that the touch face 11a is vibrated to stimulate the tactile sensation. Thereby, the tactile sensation is provided to the operator such that the operator recognizes that the input operation is completed. Accordingly, even if the button switch such as the push-button switch (push-type button switch) is graphically depicted on the touch sensor, the operator performs the input operation with the touch sensor 11 feeling the realistic click sensation similar to that obtained when operating the push-button switch. Thus, the operator may not have the feeling of strangeness. Moreover, since the operator carries out the input operation in conjunction with perception to "have pressed" the touch sensor 11, it prevents erroneous inputs caused by mere tapping.

In addition, when the standard of the pressure load to provide the tactile sensation is set higher than the load at which the touch sensor 11 responds to the touch input (setting the timing to provide the tactile sensation later than the timing of response to the touch input by the touch sensor 11), the control unit 17 determines an input position according to a touch operation to the touch face 11a and changes a display state of the input object at a corresponding portion of the display unit 12. Then, when the pressure load on the touch face 11a detected based on the output from the piezoelectric element 12 satisfies the standard to provide the tactile sensation, the control unit 17 drives the piezoelectric element 13 to provide the tactile sensation and also execute a predetermined operation (for example, execution and processing of a program corresponding to the object) by confirming the input position. In this case, the operator confirms that the input object is selected, by seeing a change of the display state of the input object displayed on the display unit 12. Moreover, since the click sensation is provided to the operator upon pressing the touch face 11a, the operator recognizes that the input object selected is determined (executed). Thereby, it prevents erroneous inputs by a so-called wandering finger.

Second Embodiment

Figure 5:
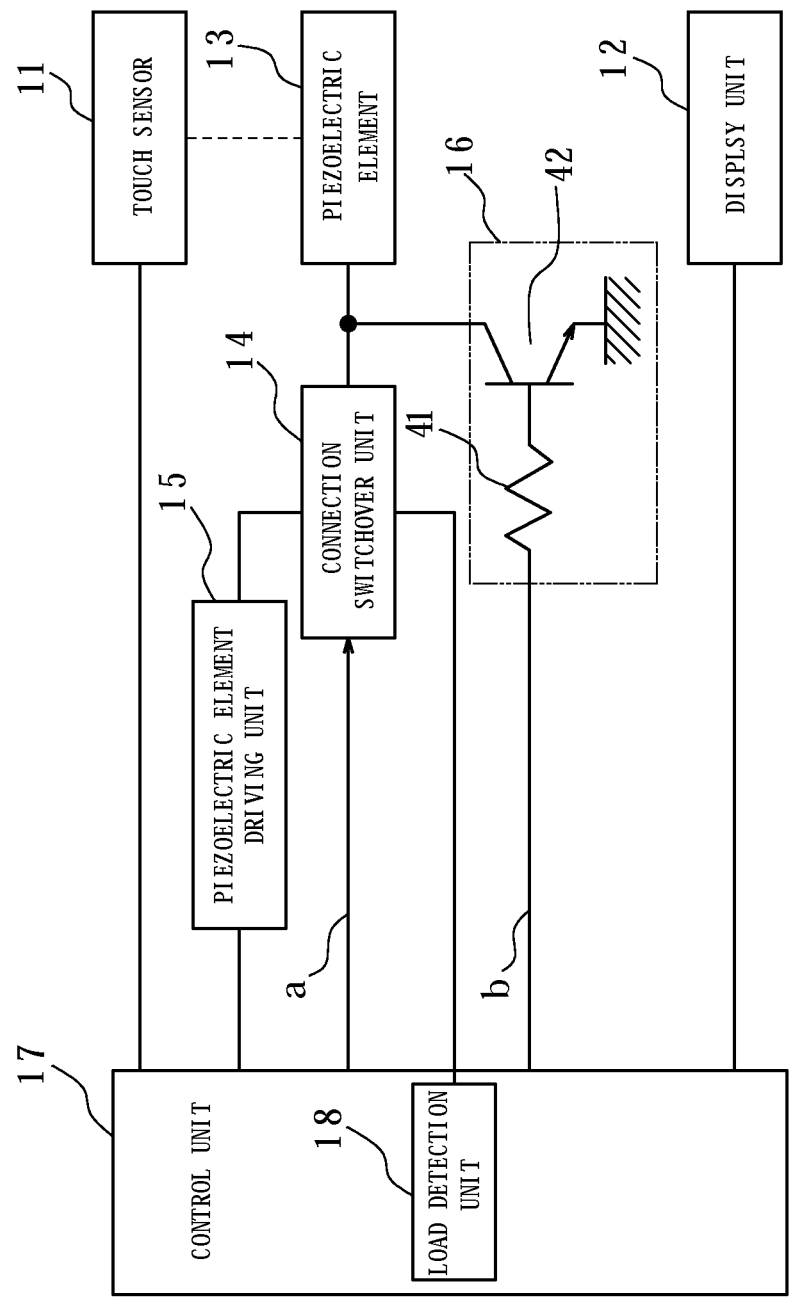
FIG. 5 is a functional block diagram illustrating a schematic configuration of an input apparatus according to a second embodiment of the present invention.

FIG. 5 is a functional block diagram illustrating a schematic configuration of an input apparatus according to a second embodiment of the present invention. This input apparatus has a discharge circuit 16 connected to the piezoelectric element 13 in addition to the configuration illustrated in FIG. 1 and, after drive of the piezoelectric element 13, the discharge circuit 16 forces discharge of the residual electric charge remained in the piezoelectric element 13 to ground.

The discharge circuit 16 has, for example, a resistor 41 and a switching transistor 42 for discharge. The switching transistor 42 has a collector connected to a positive polarity terminal of the piezoelectric element 13 and an emitter connected to ground. In addition, a base of the switching transistor 42 is connected to the control unit 17 via the resistor 41 such that a discharge control signal b is supplied from the control unit 17. Other configurations are the same as those in FIG. 1, and thus components for the same functions are provided with identical reference signs and descriptions thereof are omitted.

Figure 6:
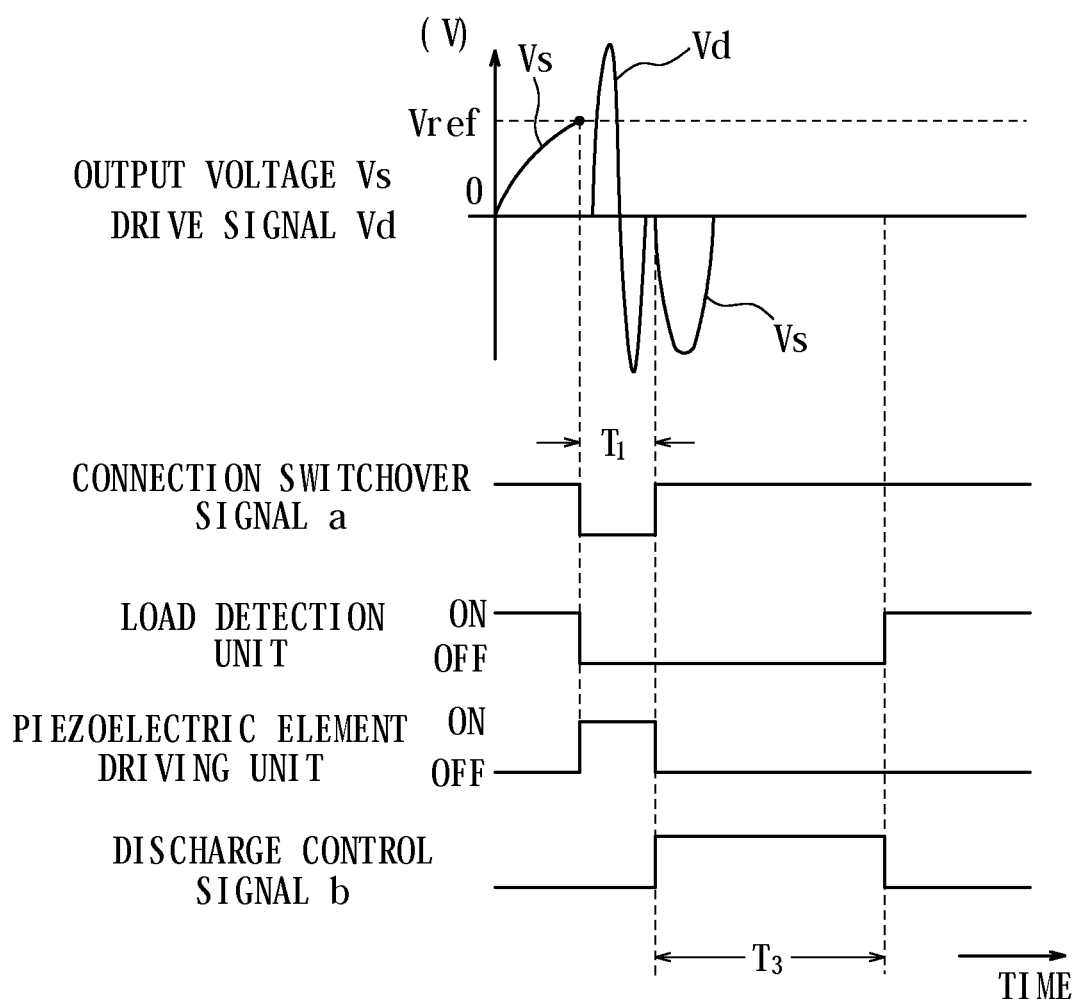
FIG. 6 is a timing chart illustrating a schematic operation of the input apparatus illustrated in FIG. 5.

FIG. 6 is a timing chart illustrating a schematic operation of the input apparatus according to the present embodiment. According to the input apparatus of the present embodiment, after the piezoelectric element drive unit 15 drives the piezoelectric element 13, that is, during a predetermined period $T_3$ after expiration of the predetermined period $T_1$ to set the connection switchover signal a at the level L, the discharge control signal b is set at the level H. Accordingly, the switching transistor 42 is conducted such that the residual electric charge accumulated in the piezoelectric element 13 is forcibly discharged to ground via a collector-emitter pathway.

In addition, the load detection unit 18 neutralizes (cancels) the output voltage Vs from the piezoelectric element 13 until expiration of the predetermined period $T_3$ in which the discharge control signal is set at the level H. Then, from a point when the predetermined period $T_3$ expires, the load detection unit 18 enables the output voltage Vs from the piezoelectric element 13 and resumes detection of the pressure load based on the output voltage Vs. Other operations are the same as those in the first embodiment, thus descriptions thereof are omitted.

According to the input apparatus of the present embodiment, as described above, after the piezoelectric element drive unit 15 drives the piezoelectric element 13, the residual electrical charge in the piezoelectric element 13 is forcibly discharged to ground through the discharge circuit 16. Thereby, the predetermined period (discharge period) $T_3$ after drive of the piezoelectric element 13 and before resumption of detection of the pressure load by the load detection unit 18 may be set to be, for example, 30 ms, which is shorter than the predetermined period $T_2$ according to the first embodiment. Accordingly, in addition to the effect of the first embodiment, in so-called repetitive inputs to continuously carry out the input operation to the same input object displayed on the display unit 12, an effect is obtained such as to appropriately provide the tactile sensation at each input operation.

Third Embodiment

Figure 7:
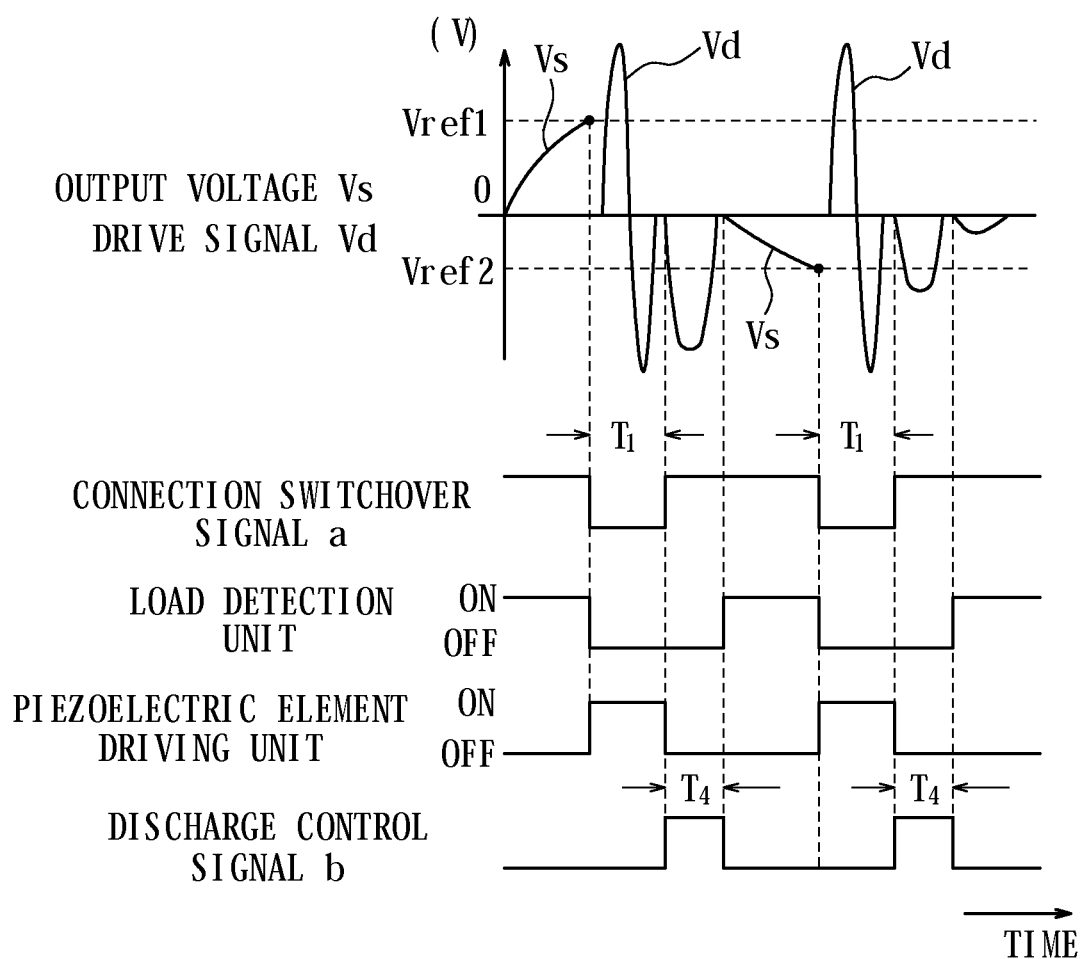
FIG. 7 is a timing chart illustrating a schematic operation of an input apparatus according to a third embodiment of the present invention.
Figure 8:
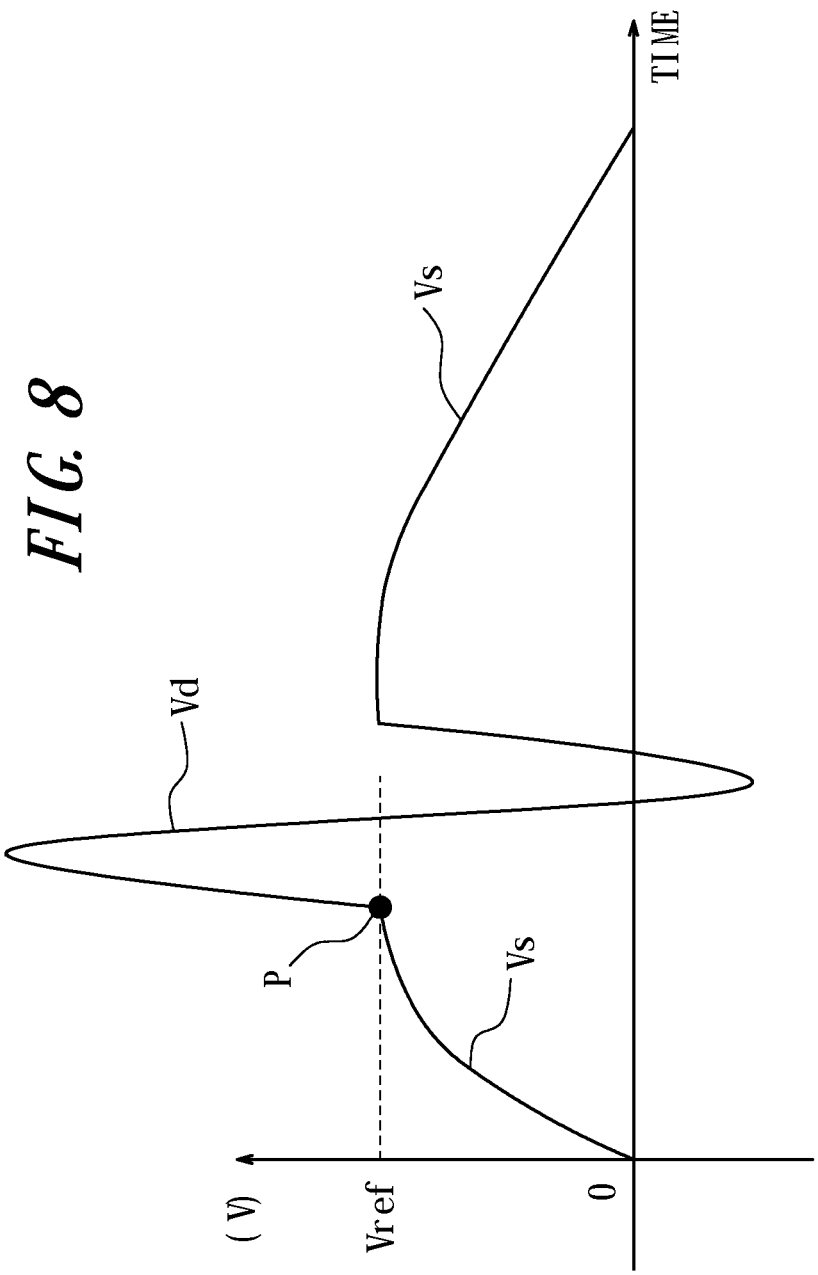
FIG. 8 is a diagram illustrating a problem to be solved according to the present invention.
Figure 9:
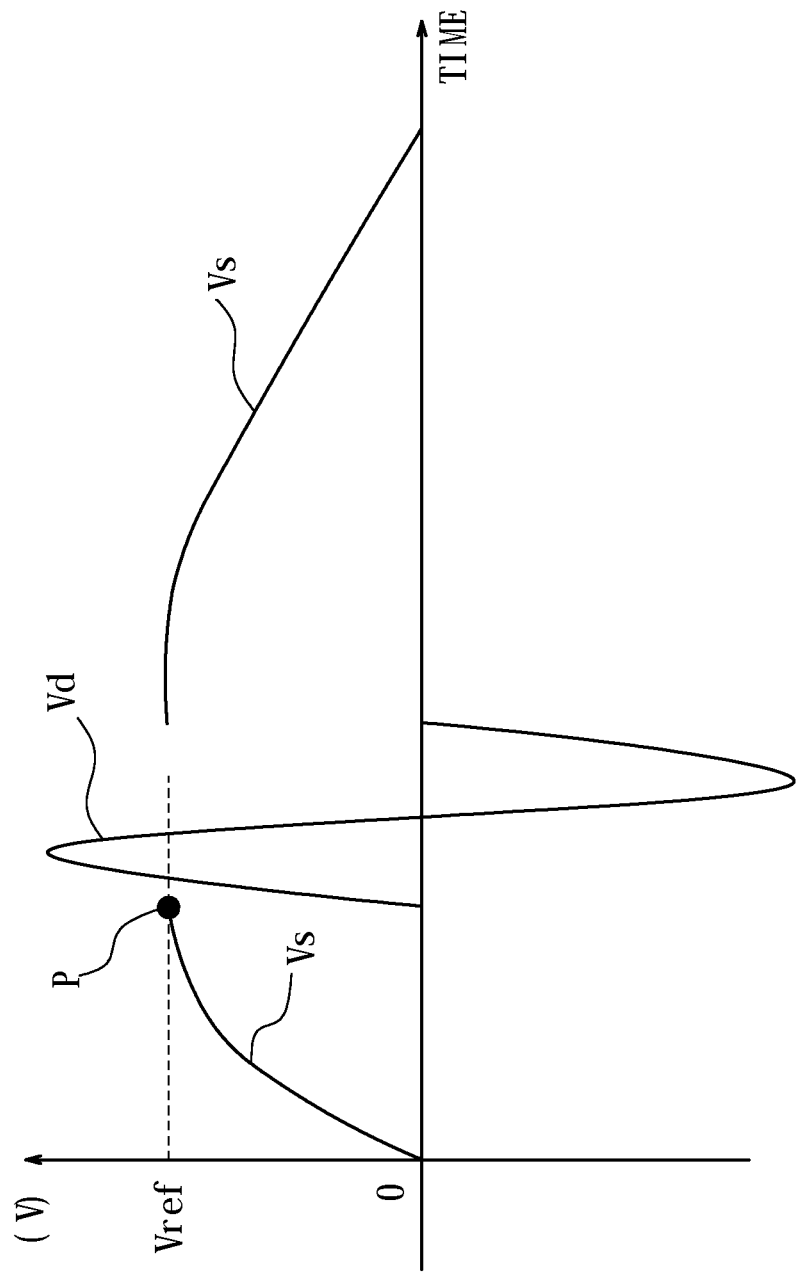
FIG. 9 is a diagram illustrating a problem to be solved according to the present invention.
Figure 10:
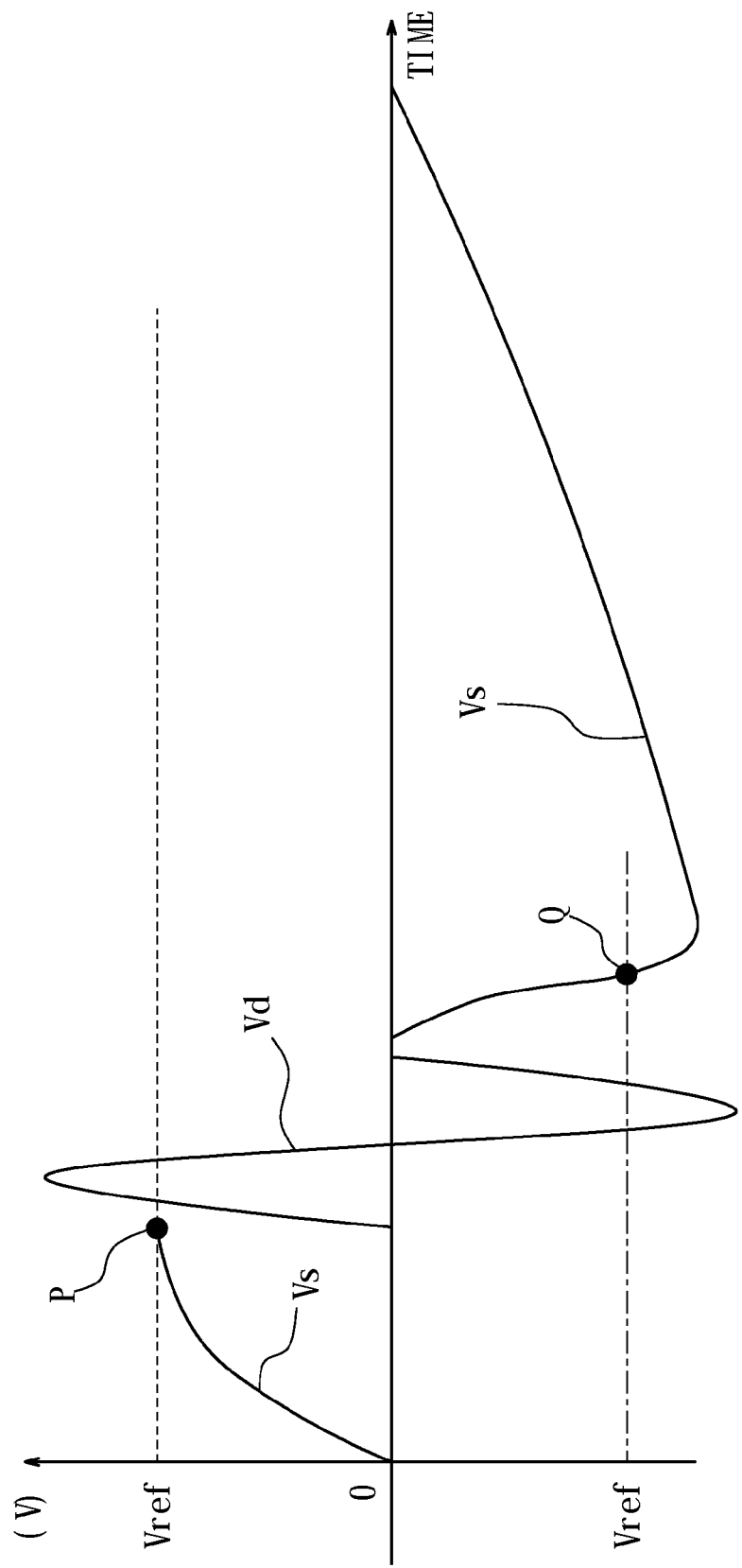
FIG. 10 is a diagram illustrating a problem to be solved according to the present invention.

FIG. 7 is a timing chart illustrating a schematic operation of an input apparatus according to a third embodiment of the present invention. The input apparatus according to the present embodiment has the configuration illustrated in FIG. 5 and provides the tactile sensation also when the pressing object is released from the touch face of the touch sensor 11. To that end, the load detection unit 18 has a first standard voltage Vref1 corresponding to the standard of the load to provide the tactile sensation in pressing (corresponding to the standard voltage Vref according to the first and second embodiments) and a second standard voltage Vref2 corresponding to a standard of the load to provide the tactile sensation in releasing. The second standard voltage Vref2 has a polarity different from that of the first standard voltage Vref1. The following is a description of the schematic operation of the input apparatus according to the present embodiment with reference to FIG. 5.

First, in the similar manner to the above embodiments, when the control unit 17 determines that the position information from the touch sensor 11 indicates that an input is performed to the input object displayed on the display unit 12 and the load detection unit 18 determines that the output voltage Vs of the piezoelectric element 13 has reached the first standard voltage Vref1 corresponding to the standard of the load (for example, 1.5 N) to provide the tactile sensation, the control unit 17 sets the connection switchover signal a at the level L for only the predetermined period $T_1$. Thereby, the piezoelectric element 13 is connected to the piezoelectric element drive unit 15 via the switchover control unit 14.

While the piezoelectric element 13 is connected to the piezoelectric element drive unit 15, the control unit 17 controls the piezoelectric element drive unit 15 to output the predetermined drive signal Vd to drive the piezoelectric element 13. Thereby, the touch panel 11 is vibrated such that the tactile sensation is provided to the pressing object pressing the touch face.

Subsequently, when the predetermined period $T_1$ to drive the piezoelectric element 13 by the piezoelectric element drive unit 15 expires, the control unit 17 sets the connection switchover signal a at the level H and changes the connection of the piezoelectric element 13 from the piezoelectric element drive unit 15 to the control unit 17. Simultaneously, the control unit 17 sets the discharge control signal b at the level H for a predetermined period (discharge period) $T_4$ and discharges the residual electric charge accumulated in the piezoelectric element 13 to ground via the collector-emitter pathway of the switching transistor 42.

The load detection unit 18 does not detect the pressure load before expiration of the predetermined period $T_4$, in which the discharge control signal b is at the level H. Then, from a point when the predetermined period $T_4$ expires, the load detection unit 18 resumes detection of the pressure load based on the output voltage Vs from the piezoelectric element 14. In order to retain a state that the touch sensor 11 is pressed by the pressing object, the predetermined period (discharge period) $T_4$ is set to be shorter than the predetermined period $T_3$ according to the second embodiment such as, for example, approximately 20 ms.

Here, since the piezoelectric element 13 is connected to ground for the predetermined period $T_4$ to discharge the residual electric charge, the output voltage Vs of the piezoelectric element 13 is 0 V at an end of the predetermined period T4. Accordingly, if the touch sensor 11 is pressed by the pressing object at this point, the output voltage Vs of the piezoelectric element 13 is 0 V in that state. As a result, when the piezoelectric element is displaced returning to an original state in accordance with a release operation of the pressing object, the output voltage of the piezoelectric element 13 increases to the negative polarity side in accordance with the displacement.

Next, after the predetermined period (discharge period) $T_4$ expires, when the load detection unit 18 determines that the output voltage Vs of the piezoelectric element 13 has reached the second standard voltage Vref2 corresponding to the standard of the load to provide the tactile sensation in releasing, the control unit 17, in the same manner as the operation in pressing described above, sets the connection switchover signal a at the level L for the predetermined period $T_1$ and changes the connection of the piezoelectric element 13 from the control unit 17 to the piezoelectric element drive unit 15.

Then, in the same manner as the operation in pressing described above, while the piezoelectric element 13 is connected to the piezoelectric element drive unit 15, the control unit 17 controls the piezoelectric element drive unit 15 to output the predetermined drive signal Vd to drive the piezoelectric element 13. Thereby, the touch panel 11 is vibrated and the tactile sensation is provided to the pressing object pressing the touch face.

After that, in the same manner as the operation in pressing described above, the control unit 17 sets the connection switchover signal a at the level H and changes the connection of the piezoelectric element 13 from the piezoelectric element drive unit 15 to the control unit 17 and maintains the discharge control signal b at the level H for the predetermined period (discharge period) $T_4$. Thereby, the residual electric charge accumulated in the piezoelectric element 13 is discharged. Then, from a point when the predetermined period $T_4$ for discharge by the discharge circuit 16 expires, the load detection unit 18 resumes detection of the pressure load based on the output voltage Vs of the piezoelectric element 14 and prepares for detection of a next touch input.

The input apparatus according to the present embodiment offers the same effect as the above embodiments. According to the present embodiment, in addition, since the tactile sensation is provided also when the pressing object is released from the touch sensor 11, it is possible to provide a realistic operation sensation of the push-button switch such as a metal dome switch. That is, it is possible to provide a realistic click sensation "Cli" obtained when the metal dome is depressed in pressing and a realistic click sensation (in this case, release sensation) "Ck" obtained when the metal dome recovers from depression in releasing. It is to be appreciated that the drive signal for the release sensation does not necessarily need to be the same as that for the click sensation. The tactile sensations "Cli", "Ck", "Click", the "throbbing" sensation, the "jelly-like" sensation and the "vibrating" sensation set forth in the present specification are sensations obtained by the operator described in Japanese. Examples of the drive signals to provide actual tactile sensations are set forth above.

Here, although the standard of the load to provide the release sensation may be set to be the same as the standard (for example, 1.5 N) to provide the click sensation in pressing set forth above, it is preferable to set the standard of the load to provide the release sensation to be 50-80% lower than that to provide the click sensation in pressing (for example, 1 N). Thereby, timings to provide the tactile sensations are synchronized with timings of sequential inputs when the same position (input object) is repetitively input (tapped), providing the realistic click sensation without the feeling of strangeness. That is, setting the standard of the load to provide the tactile sensation in releasing to be smaller than that in pressing enables to prevent the feeling of strangeness. In addition, setting the standard of the load to provide the tactile sensation in releasing to be approximately 50% or more of that in pressing contributes to a significant improvement in operability in the repetitive input. Moreover, setting the standard of the load to provide the tactile sensation in releasing to be approximately 80% or less of that in pressing enables to deal with a faint load change in a holding state in the repetitive input.

It is to be understood that the present invention is not limited to the embodiments set forth above and various changes may be implemented within the spirit of the present invention. For example, the switching transistor 42 of the discharge circuit 16 illustrated in FIG. 5 may include a semiconductor relay and the like. In addition, the piezoelectric element 13 may have a known configuration such as monomorph, unimorph, bimorph and a laminated type, based on a size, vibration amplitude and the like of the touch sensor 11.

The present invention is effectively applicable to the input apparatus in which the touch sensor functions as a touch switch for ON/OFF operations. In addition, the input apparatus according to the present invention drives the piezoelectric element when the pressure load detected based on the output of the piezoelectric element satisfies the standard to provide the tactile sensation. Here, "when the pressure load detected based on the output of the piezoelectric element satisfies the standard to provide the tactile sensation" may include either "when the pressure load detected reaches a standard value to provide the tactile sensation", "when the pressure load detected exceeds the standard value to provide the tactile sensation", or "when the standard value to provide the tactile sensation is detected based on the output of the piezoelectric element".

REFERENCE SIGNS LIST 11 touch sensor
11a touch face
12 display unit
13 piezoelectric element
14 connection switchover unit
15 piezoelectric element drive unit
16 discharge circuit
17 control unit
18 load detection unit
31 housing
32 insulator
33 upper cover
34 insulator
42 switching transistor

The invention claimed is:

1. An input apparatus comprising:

a touch sensor configured to detect a touch input;

a piezoelectric element mounted on the touch sensor;

a load detection unit configured to detect a pressure load on a touch face of the touch sensor based on an output of the piezoelectric element and to determine whether the pressure load satisfies a standard to provide a tactile sensation; and a piezoelectric element drive unit configured to drive the piezoelectric element, when the load detection unit determines that the pressure load satisfies the standard, such that the tactile sensation is provided to an object pressing the touch face, wherein the load detection unit resumes detection of the pressure load after a predetermined period from drive of the piezoelectric element by the piezoelectric element drive unit, and residual electric charge accumulated in the piezoelectric element discharges in the predetermined period.

2. The input apparatus according to claim 1, further comprising a discharge circuit configured to discharge the residual electric charge accumulated in the piezoelectric element, wherein the discharge circuit discharges, in the predetermined period, the residual electric charge accumulated in the piezoelectric element.

3. The input apparatus according to claim 1, wherein the predetermined period is 40 ms or less.

* * * * *